T. H. MACE.
WASHING MACHINE.
APPLICATION FILED MAR. 21, 1911.

1,007,585.

Patented Oct. 31, 1911.

3 SHEETS—SHEET 1.

Inventor
Tine H. Mace,

Witnesses

By Victor J. Evans
Attorney

T. H. MACE.
WASHING MACHINE.
APPLICATION FILED MAR. 21, 1911.

1,007,585.

Patented Oct. 31, 1911.

3 SHEETS—SHEET 2.

Witnesses

Inventor
Tine H. Mace,

By Victor J. Evans
Attorney

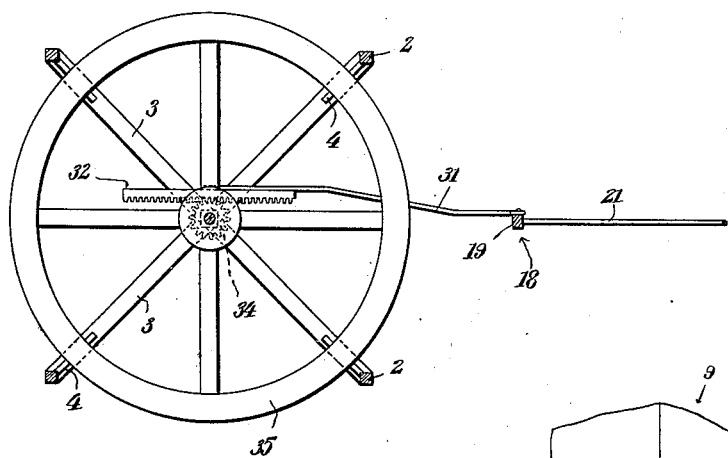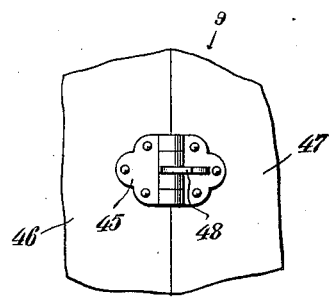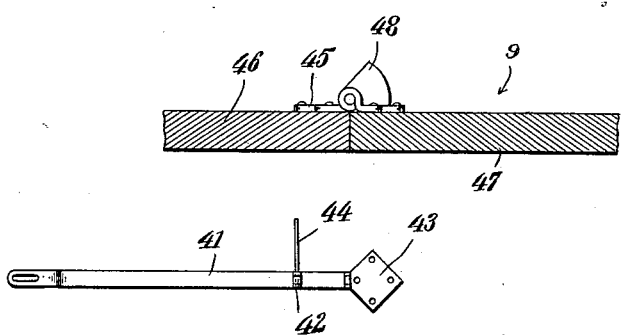

UNITED STATES PATENT OFFICE.

TINE H. MACE, OF CLARENDON, TEXAS.

WASHING-MACHINE.

1,007,585.  Specification of Letters Patent.  Patented Oct. 31, 1911.

Application filed March 21, 1911. Serial No. 615,873.

*To all whom it may concern:*

Be it known that I, TINE H. MACE, a citizen of the United States, residing at Clarendon, in the county of Donley and State of Texas, have invented new and useful Improvements in Washing-Machines, of which the following is a specification.

This invention relates to washing machines and one of the objects is the provision of a novel operating mechanism for the machine whereby the rubber may be conveniently and easily reciprocated.

A further object of the invention is the provision of an operating mechanism, the lever of which is adapted to be adjusted so that the machine may be operated in a standing or a sitting position.

Further objects of the invention will appear as the following specific description is read in connection with the accompanying drawings, which form a part of this application, and in which:—

Figure 1:
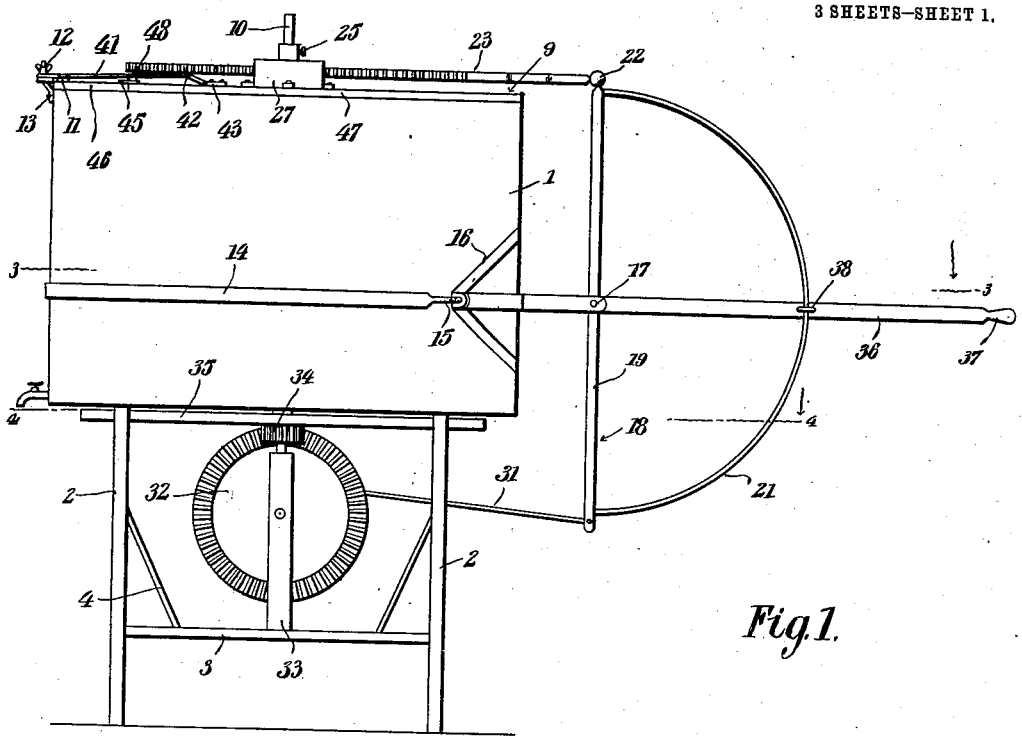
Figure 5:
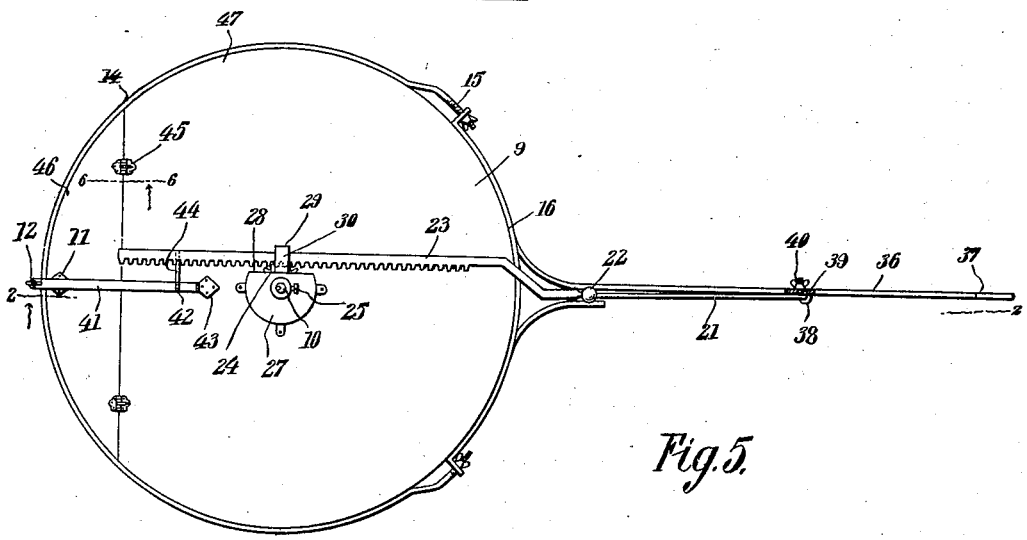
Figure 2:
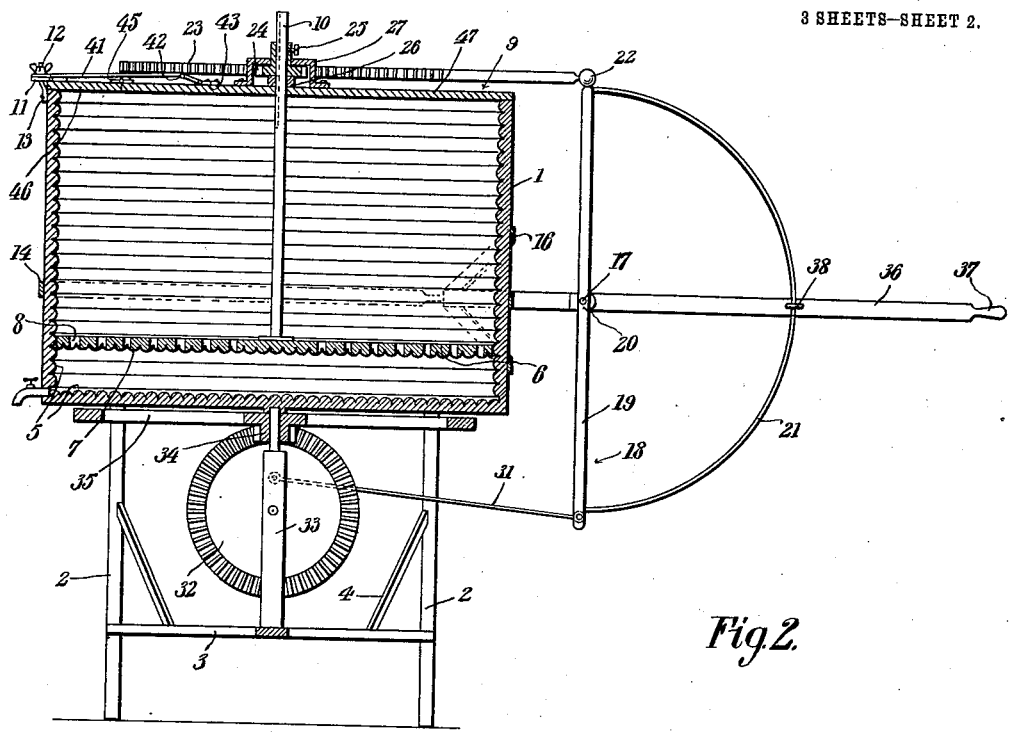
Figure 3:
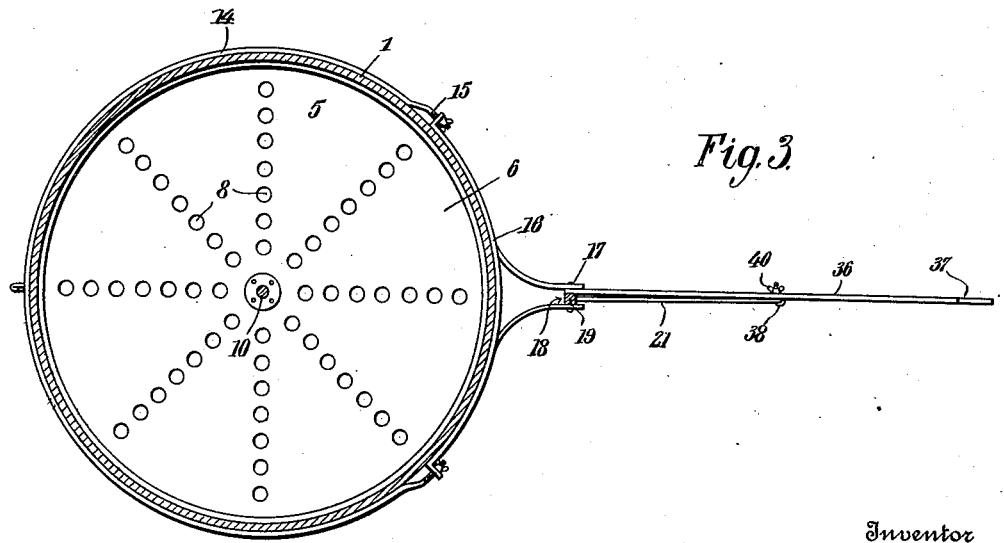

Figure 1 is a side elevation. Fig. 2 is a vertical sectional view on the line 2—2 of Fig. 5. Fig. 3 is a horizontal section taken on the line 3—3 of Fig. 1. Fig. 4 is a similar section on the line 4—4 of Fig. 1 looking in the direction of the arrows. Fig. 5 is a top plan view. Fig. 6 is a detail section on an enlarged scale on the line 6—6 of Fig. 5. Fig. 7 is an enlarged detail top plan view. Fig. 8 is a top plan view of the operating rod.

Referring more particularly to the drawings, 1 represents a tub which is preferably supported upon four legs 2 spaced apart by the horizontal braces 3 and the diagonally arranged struts 4. The tub is corrugated upon its sides and bottom, as shown at 5, and mounted to rotate therein is a rubber 6 which is also corrugated, as shown at 7, on its under side and is provided with a plurality of apertures 8 through which the water may circulate. The tub is provided with a lid 9 which is hinged on one side of the tub and is apertured to receive an operating shaft 10 of the rubber 6. The opposite side of the lid has a hinged hasp 11 secured thereto which is adapted to engage over a turn button 12 pivotally mounted upon a plate 13 secured to the side of the tub. Surrounding the tub is a band 14 whose ends are preferably connected to adjusting bolts 15 which secure to the band a bearing bracket 16 upon the outer end of which is pivoted, as at 17, a walking beam 18. This vertical beam comprises a vertical member 19 having a bearing 20 thereon to connect to the bracket 16 and a semi-cylindrical bow 21 having its terminals connected to the ends of the vertical member 19. The upper end of the terminal member 19 has also secured thereto a suitable universally mounted clamp 22 in which is secured a rack bar 23. This rack bar extends across the top 9 and engages a gear 24 which is adjustably secured upon the rod or shaft 10 by means of a set screw 25. The shaft 10 is preferably grooved throughout its length so as to receive an internal rib on the gear which is mounted between a bearing washer 26 carried by the top and the under side of an inclosing casing 27 which is cutaway at 28 to permit the projection of the gear and to permit its engagement by the rack bar. Immediately adjacent the smooth side of the rack bar a pin 29 is rotatably mounted in the top and is adapted to prevent lateral movement of the rack bar. An overhanging head 30 on the pin prevents the rack bar from rising when said head is turned over the rack bar. The opposite end of the vertical member 19 has pivotally connected to it a pitman 31 whose opposite end is eccentrically connected to a gear wheel 32 mounted upon a vertical standard 33 extending between the horizontal cross bar 3 and the bottom of the tub. This gear 32 is adapted to mesh with a pinion 34 connected integrally to a fly wheel 35 journaled upon the standard 33. By reciprocating the walking beam in the manner to be hereinafter described the rack bar is carried back and forth over the tub and the rubber 6 subjected to a rotary reciprocating motion, which action is aided and the power necessary to operate the same materially lessened by the action of the fly wheel 35 through the gears and pitman 31.

In order that the machine may be operated or in other words the walking beam reciprocated while in standing or sitting position there is pivoted at the point 17 an operating lever 36 which projects outwardly beyond the semi-circular member 21 and is provided with a handle 37. This lever is adjustably connected to the bow member 21 by means of a hook screw 38 which passes through an aperture 39 in the lever and has its hooked end engaged with the member 21. A thumb screw 40 threaded upon its opposite end holds the lever in adjusted position.

The hasp 11 has pivotally connected to it an operating rod 41 which is in two sections hinged together, as at 42, the opposite or short section being pivotally connected to a plate 43 carried upon the lid. At the hinged joint a cross piece 44 is secured which lies underneath the rack bar 23. By turning the pin 29 so as to remove the lateral head 30 from over the rack bar and by raising the hasp 11 the cross piece 44 is raised beneath the rack bar and the latter thus disconnected from the gear 24. When it is desired to raise the lid the rack bar is disconnected in the manner described and the set screw 25 loosened so that the rubber 6 may be pulled up to a point immediately below the lid.

The hinges 45 which connect the separate sections 46 and 47 of the lid have mounted on their pintles segmental plates 48 which limit the movement of the section 47, the section 46 being preferably secured to the tub in any suitable manner.

Having thus described the invention, what I claim as new is:—

1. The combination with a tub having a rubber mounted therein for rotary reciprocation, a walking beam pivoted to the tub and connected to operate said rubber, and a fly wheel connected to the opposite end of the walking beam.

2. The combination with a tub having a rubber mounted for rotary reciprocation, a walking beam pivoted to the tub, an operative connection between one end of the walking beam and the rubber, a fly wheel mounted beneath the tub, a driving connection between the fly wheel and the opposite end of the walking beam, and a lever adjustably mounted on the walking beam for operating the same.

3. The combination with a tub and a rubber mounted therein for rotary reciprocation, of a walking beam pivoted to the tub, a shaft adjustably mounted in the tub and connected to the rubber, a gear on the shaft, a rack bar hinged to one end of the walking beam and adapted to engage said gear, a horizontally mounted fly wheel arranged beneath the tub, a gear for driving said fly wheel, an operating connection between said gear and the opposite end of the walking beam, together with a lever adjustably mounted upon the walking beam for operating the same.

4. The combination with a tub having a lid thereon and a rubber mounted in the tub for rotary reciprocation, of a gear journaled on the lid, an operating shaft connected to the rubber and adjustably mounted in the gear, a bracket on the tub, a walking beam pivoted on the bracket, a rack bar hinged to one end of the walking beam, means for holding the rack bar in movable engagement with the gear, and a pivoted lever adjustably mounted upon the walking beam for operating the rack bar.

5. The combination with a tub having a hinged top thereon, of a gear journaled on the top, a rubber mounted in the tub and having an operating shaft adjustably engaged with the gear, a rack bar for engagement with the gear, means to hold the rack bar in engagement with the gear, a hasp for holding the lid in closed position, and means operated by the hasp for throwing the rack bar out of engagement with the gear when the holding means is released.

6. In a device of the class described, the combination with a tub and a rubber therein, of a band surrounding the tub, a pivoting bracket mounted on the tub and held in position by the band, a cross bar pivoted upon the bracket, a pivotal operative connection between one end of the cross bar and rubber, a lever pivoted upon the bracket, a bow member connecting both ends of the cross bar and an adjustable connection between the lever and the bow member.

In testimony whereof I affix my signature in presence of two witnesses.

TINE H. MACE.

Witnesses:
R. H. BEVILLE,
ISAAC LOONEY.

Copies of this patent may be obtained for five cents each, by addressing the "Commissioner of Patents, Washington, D. C."